United States Patent [19]

Ceylan

[11] Patent Number: 4,694,948
[45] Date of Patent: Sep. 22, 1987

[54] TRAVELLING HOPPER BELT CAR

[75] Inventor: Sükrü Ceylan, Lubeck, Fed. Rep. of Germany

[73] Assignee: O & K Orenstein & Koppel Aktiengesellschaft, Fed. Rep. of Germany

[21] Appl. No.: 802,520

[22] Filed: Nov. 27, 1985

[30] Foreign Application Priority Data

Nov. 30, 1984 [DE] Fed. Rep. of Germany ....... 3443684

[51] Int. Cl.[4] ............................................. B65G 41/00
[52] U.S. Cl. .................................... 198/311; 198/512; 198/550.2; 414/505
[58] Field of Search ............ 198/311, 512, 521, 550.2; 209/257, 260, 935; 298/13, 14; 414/595, 596, 597, 598, 502, 505

[56] References Cited

U.S. PATENT DOCUMENTS

| 3,402,816 | 9/1968 | Taylor | 209/260 |
| 3,442,189 | 5/1969 | Robinson et al. | 198/311 X |
| 4,299,695 | 11/1981 | Bostrom | 209/260 |
| 4,345,680 | 8/1982 | Kay | 198/311 X |

FOREIGN PATENT DOCUMENTS 844823  5/1939  France ................................ 414/598

Primary Examiner—Robert J. Spar
Assistant Examiner—Jonathan D. Holmes
Attorney, Agent, or Firm—McGlew and Tuttle

[57] ABSTRACT

A travelling hopper belt car has a feed chute and a throw-off conveyor belt that can pivot in a vertical plane around a horizontal axis in the area of the feed chute. The side walls of the feed chute are designed in two parts with the upper side section in each case foldable down around a horizontal axis at least to the height of the axis.

12 Claims, 7 Drawing Figures

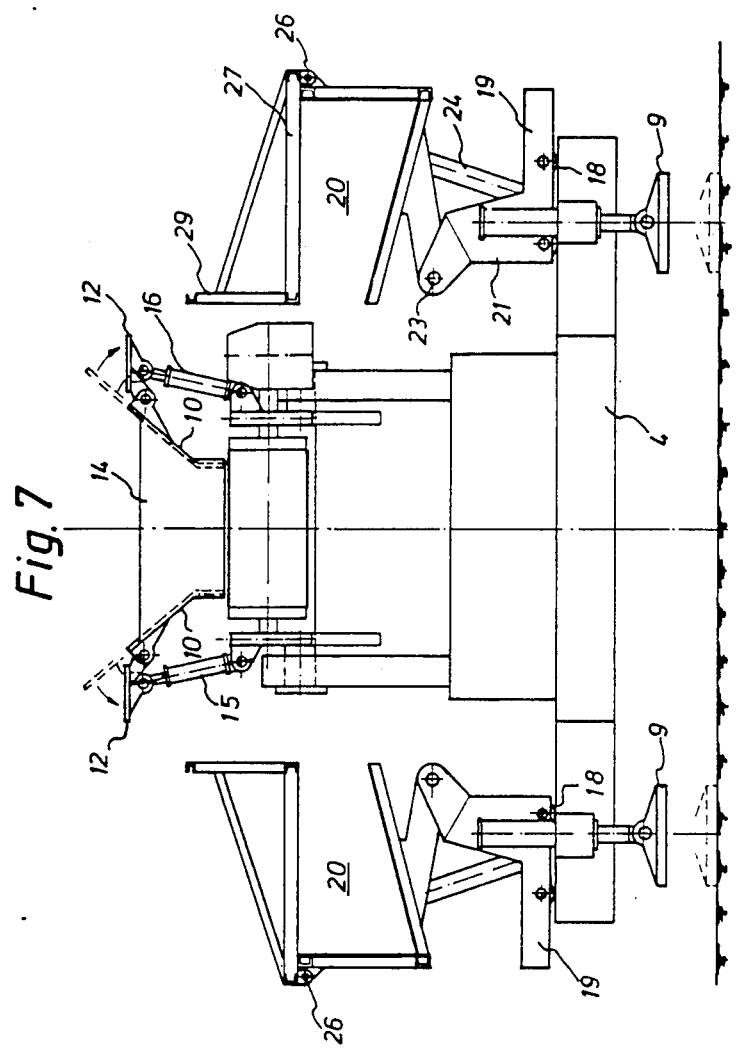

TRAVELLING HOPPER BELT CAR

FIELD AND BACKGROUND OF THE INVENTION

The invention relates to a travelling hopper belt car with a feed chute and a throw-off conveyor belt that can pivot on a horizontal axis in a vertical plane in the area of the feed chute.

Systems of this kind are used for up-take of material to be conveyed that is differentially fed to the conveyor system and is to be differentially released.

Such equipment is described in *Braunkohle*, Issue 10, page 345, and Issue 11, page 395, of 1981. It is used, among other things, for conveyor systems in surface mining operations. It is used as a link between discontinuous extraction and continuous conveyance of lignite, as well as for other purposes. For example, several excavators, such as power shovels, can be used alternately to load such hopper belt cars.

To protect the belt of the hopper belt car, a known method is to add grizzly screens that tilt hydraulically to the belt. The hopper of such a system may comprise two bucket fillings. The grizzly screen can be cleaned from time to time by dumping and hydraulic lifting of lumps on material on the screen.

French Pat. No. 1,188,800 describes a conveyor belt that is loaded discontinuously with material. Problems tend to arise most often when the feedstock adheres or cakes together to the conveyor belt. There is a danger then that the conveyor belt will be erratically loaded. To avoid this problem, the side walls of the feed hopper are divided, and the upper section of the side walls is capable of pivoting on a horizontal axis. The upper parts of the side walls are designed as grates, with bars running roughly vertically and bent into a trough shape. Trough-shaped pickup spaces are thereby created, the grate walls of which can be pivoted upwardly. The adhering material can then slide down along these grate walls as they pivot upwardly. Such feed devices are also intended for other uses, such as unloading out of transfer troughs under such travelling conveyor cars.

German patent disclosure No. 1,947,520 describes a feed device for conveyor belts that is supposed to be particularly useful for loading a conveyor belt with two part trailers and can be driven even by inexperienced drivers without the assistance of other auxiliary personnel.

The German patent disclosure solves this problem by an arrangement with at least one platform that is positioned with the capacity to pivot in the area of the feed point of the conveyor belt. At one end position, the platform lies on the ground and can be travelled on or over. At its other end position the platform constitutes at least one vertical side wall for the conveyor belt system.

SUMMARY OF THE INVENTION

The present invention seeks to solve the problem of creating a hopper belt car that is suitable for both continuous feed of material to be conveyed, from a bucket wheel excavator, for example, and for intermittent or discontinuous loading with the aid of wheel loaders, for example. In addition, a throw-off device for the hopper belt car should be capable of being adjusted so low that it can travel under low bridges or other structures for conveyor equipment, such as conveyor belts or the like, without interrupting the operation of the conveyor system, in surface mining operations, for example. For instance, the conveyor device should be so designed that it should be capable of being driven in a position at which it does not exceed an overhead clearance of approximately 6 meters.

In addition, the carry-off belt of the device should be designed so that even when a large quantity of material to be conveyed is delivered all at once, it does not slide directly onto the carry-off belt, but is temporarily stored so that it can be fed as desired from storage onto the conveyor belt. In the process, the impact that occurs on feeding the quantities to be conveyed onto the carry-off belt or its support structure must be intercepted so that neither the conveyor belt nor its support structure or moving mechanism suffers.

Moreover, dependable conveyor operation with easily regulatable output from the conveyor belt car must be equipped so that large lumps can be caught by a grizzly screen. If possible, this should slide laterally on the conveyor system so that it could be moved if necessary by a wheel loader. The problem can be exemplified as follows, that given a wheel loader with a load of approximately 15 tons, the load would not hit the carry-off belt all at once, but would be fed onto the carry-off belt over the course of from one to several minutes.

Accordingly an object of the present invention is to solve the foregoing problem by providing a travelling hopper belt car with a feed chute and throw-off conveyor belt that can pivot in a vertical plane around a horizontal axis in the area of the feed chute, wherein side walls of the feed chute are designed in two sections, an upper side section being capable of holding down on a horizontal axis to at least the height of the horizontal axis. This reduces the overall height of the feed chute and the overall height of the travelling hopper belt car.

The invention offers the advantage of a hopper belt car that can be employed without difficulty at all points, in surface mining operations, for example, or at other places were required, whereby the system can be adjusted to such a low height that it can pass under structures existing at the place of application that limit passage, e.g. under belt bridges, bunker installations or the like, without disturbing the operation of such installations. The system is designed, furthermore, so that under conditions of discontinuous feed or sudden delivery of large quantities of materials to be conveyed, it is possible to transmit them relatively evenly to the conveyor belt, so that neither the belt nor its supporting or moving structures are subject to excessive stress.

A further object of the invention is to provide a travelling hopper belt car which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Further details of the invention are explained on the basis of the embodiment schematically depicted in the drawings, in which:

FIG. 7 is a sectional view taken along line E-F of FIG. 2 showing the feed end when the feed end of the hopper belt car is pivoted up and the discharge hopper is swung open.

DESCRIPTION OF THE PREFERRED EMBODIMENT

Figure 1:
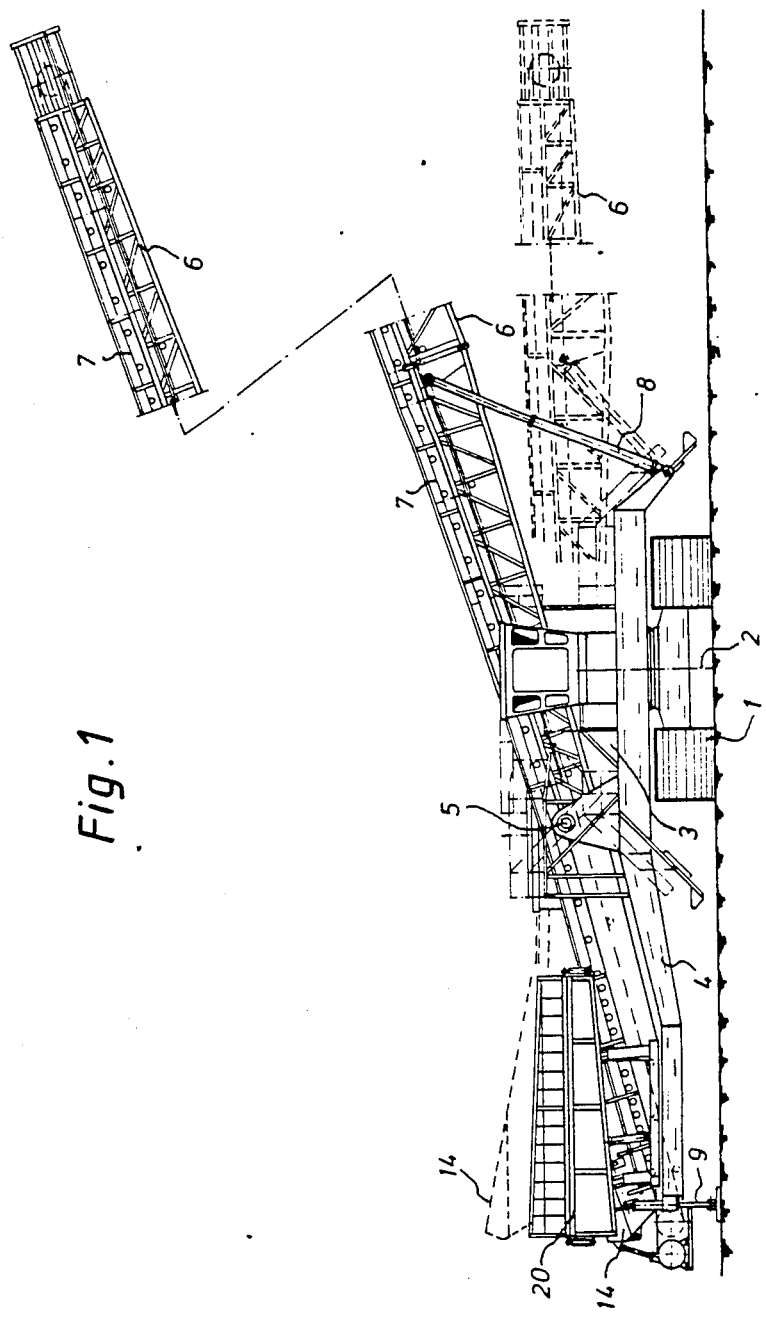
FIG. 1 is a side view of a hopper belt car with the feed end lowered.

Referring to the drawings in particular, the invention embodied therein comprises a hopper belt car which is shown in FIG. 1 for moving material which is either fed continuously or intermittently to a feed chute or trough 14. The material is moved by a throw-off belt 7 which has an upper run that moves to the right as shown in FIG. 1.

The hopper belt car of the present invention can travel along crawler tracks 1, which support a superstructure 3 that is capable of pivoting 360° around a vertical axis 2. The superstructure 3 has a support arm 4 extending on a side toward a feed point and which supports a belt carrier 6 of the throw-off belt 7, which carrier pivots on a horizontal axis 5. A hydraulic cylinder 8 serves to raise and lower the throw-off belt 7, which articulates on one end with the superstructure 3 and on the other end with the belt carrier 6.

The support arm 4 is provided on the feed side with height-adjustable supporting feet 9 that can be raised and lowered in order to support the equipment firmly on the ground or substratum while it is in operation.

Figure 2:
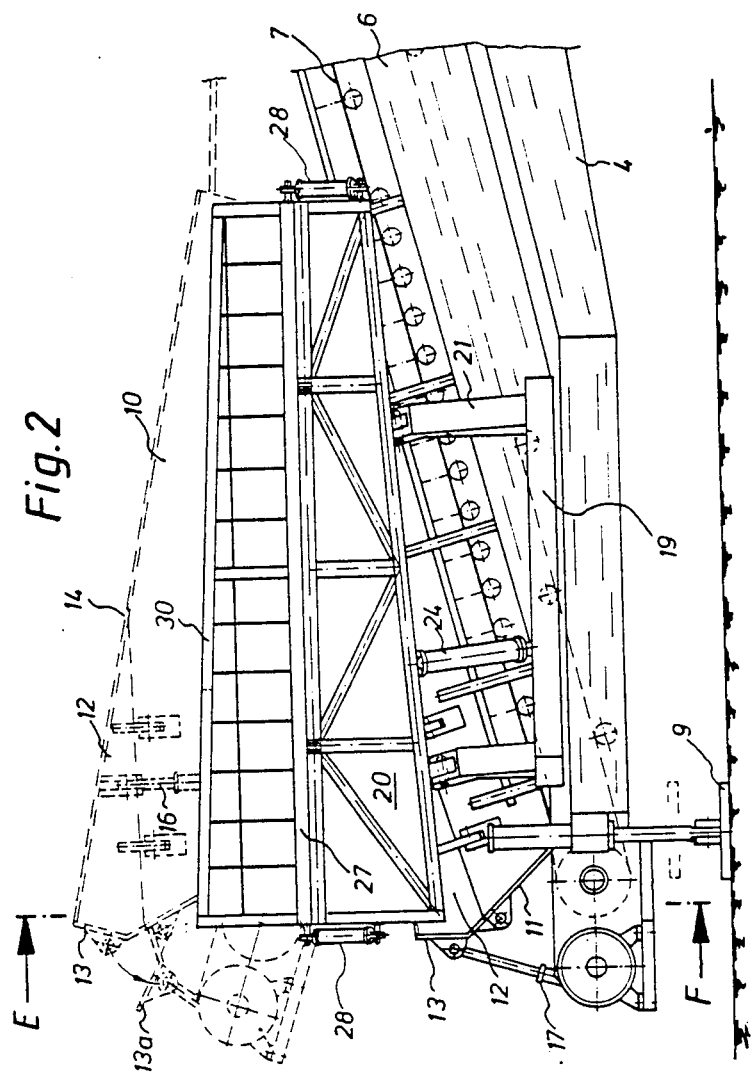
FIG. 2 is a side view of the feed end in FIG. 1, on a larger scale.
Figure 3:
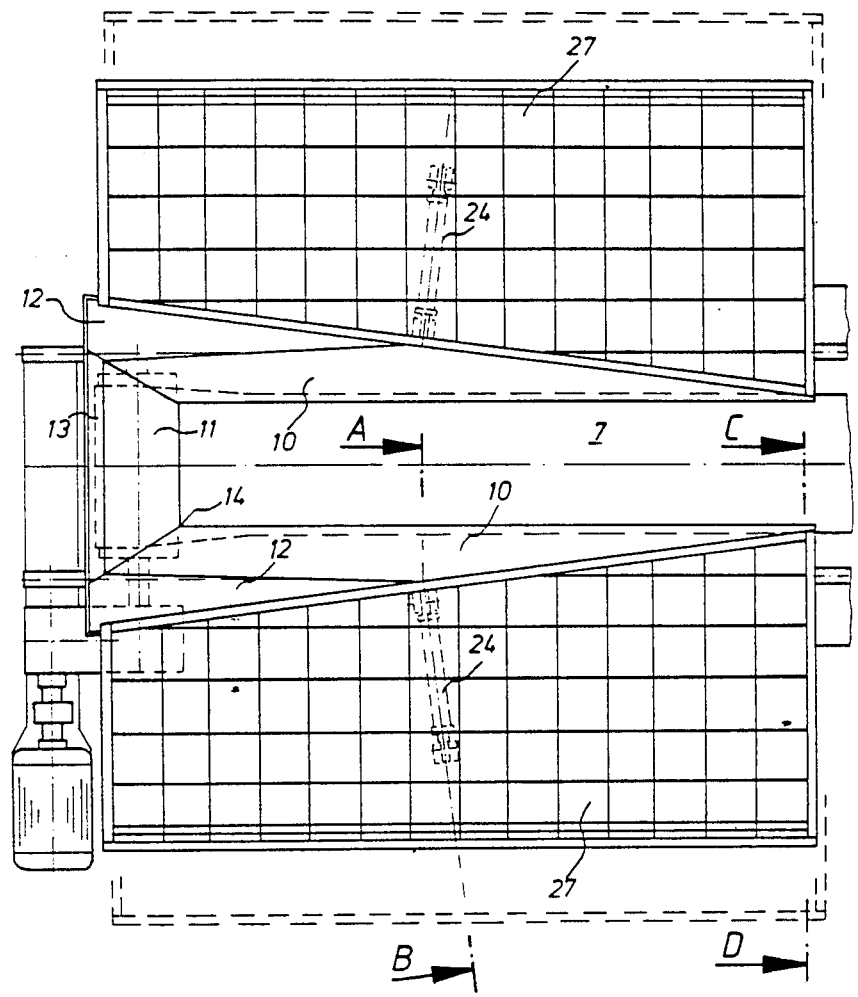
FIG. 3 is a top view of FIG. 2.
Figure 4:
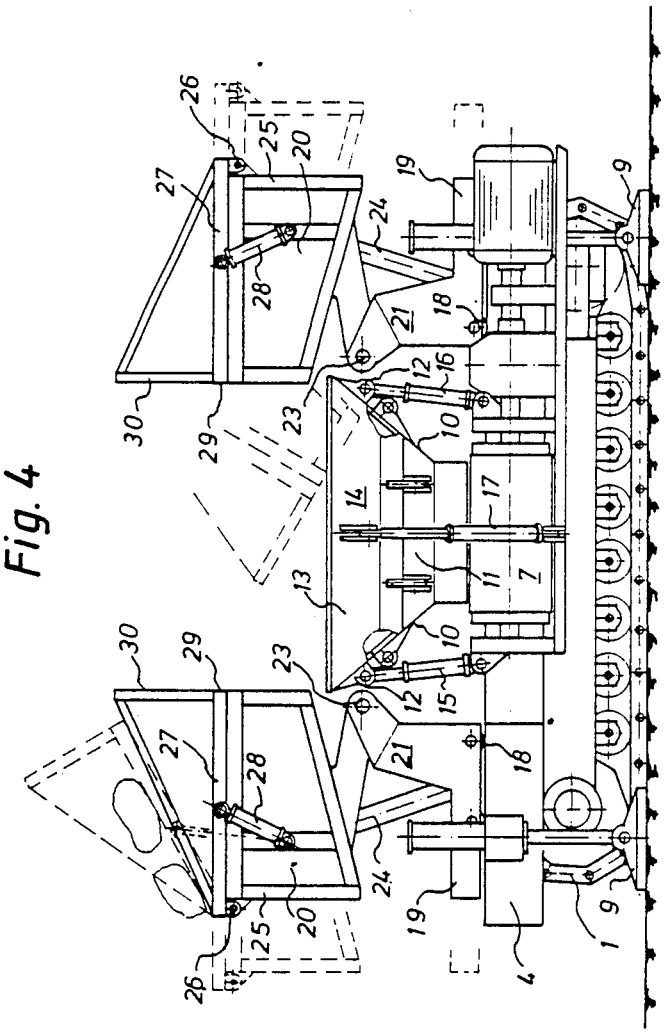
FIG. 4 is a front view of the feed end.

As shown in FIGS. 2 and 3, the lower side sections 10 of side walls and the lower back section 11 of the back wall of the feed chute 14 are attached to the belt carrier 6. As shown in FIGS. 4 and 7, the upper side sections 12 of the side walls and the upper back section 13 of the back wall are articulated on horizontal axes to the lower side sections 10 and the lower section 11 of the back wall, respectively. These elements together constitute the feed chute 14. Hydraulic cylinders 15, 16 act on the pivoting upper side sections 12 and are articulated at the other end to the belt carrier. Similarly, a hydraulic cylinder 17 acts on the upper section 13 of the back wall.

With this hydraulic drive system 15, 16, 17 the upper side sections 12 of the side walls and the upper section 13 of the back wall can be pivoted down until they lie level with or below their pivoting axis, as shown in FIG. 7 and in FIG. 2 along the broken line 13.

On the support arm 4, in the rear portion thereof, tracks that run at right angles and level with it are positioned, on which the feed devices 19 for the feed troughs 20 travel on rollers 18 (see FIGS. 2,4,5 and 7). The feed devices 19 consist of cantilever arms 21 and can be moved toward or away from the feed chute 14 on both sides by means of hydraulic cylinders 22 (see FIG. 5). The cantilever arms 21 are provided with bearings on their upper section around which the feed troughs 20 can pivot. A hydraulic cylinder 24 is again used to tilt the feed troughs 20.

On the back wall 25 of the feed troughs, grizzlies 27 are articulated to pivot around axes 26 and are moved by means of hydraulic cylinders 28.(FIG. 4). Each grizzly 27 consists of one level screen in normal position, on the front edge 29 of which is attached a vertical boundary screen 30, which prevents the larger lumps from sliding onto the throw-off belt 7. The grizzly screens 27,30 can be pivoted upwardly in such a way that large lumps or the like slide off over the pivoting edge outside and onto the ground. There the lumps can be picked up by power shovel and removed.

Figure 5:
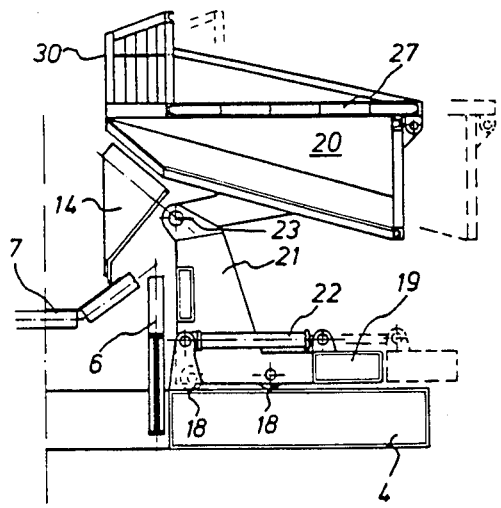
FIG. 5 is a sectional view taken along line A-B of FIG. 3.
Figure 6:
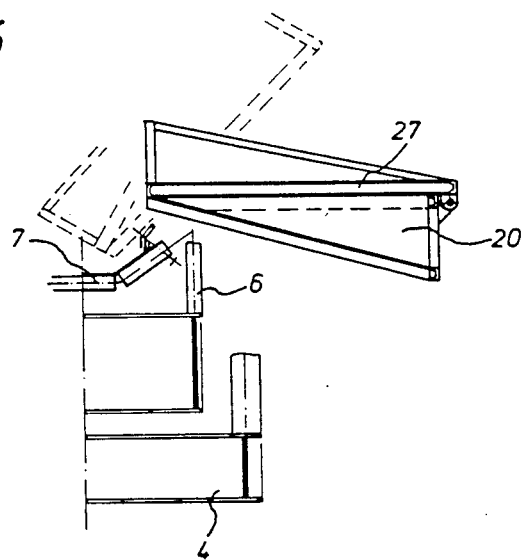
FIG. 6 is a sectional view taken along line C-D of FIG. 3.

As shown in FIGS. 4,5, and 6, the height of the feed trough 20 in section declines toward the conveyance direction of the throwoff belt, while the cross-section of the feed troughs 20 widens in the same direction. The upper edge of the feed troughs in the embodiment shown lies no higher than 4.4 m above the ground. By widening the feed trough 20, even as its height decreases, a similar intake volume is maintained along the length thereof.

Accordingly the invention is a travelling hopper belt car which comprises throw-off conveyor means 6,7 mounted for pivoting in a vertical plane about a vertical axis 5, a feed chute 14 connected to said throw-off conveyor means near the horizontal axis, the feed chute having side walls which each have upper and lower sections, the lower section of each side wall being connected to said throw-off conveyor means and the upper section of each side wall being pivotally mounted to its respective lower section about a horizontal axis for pivoting down at least to the height of said horizontal axis of said side walls.

While a specific embodiment of the invention has been shown and described in detail to illustrate the application of the principles of the invention, it will be understood that the invention may be embodied otherwise without departing from such principles.

What is claimed is:

1. A travelling hopper belt car comprising a superstructure, a belt carrier mounted for pivoting in a vertical plane around a horizontal axis on said superstructure, a throw-off belt mounted for movement in a conveying direction on said belt carrier, a feed chute connected to said belt carrier adjacent said horizontal axis, said feed chute having side walls which each include a lower section fixed to said carrier and an upper side section pivotally mounted to each lower section respectively about a further horizontal axis for folding down at least to a vertical height of said further horizontal axis, said travelling superstructure being mounted for pivoting in a horizontal plane about a vertical axis, a support arm mounted on said superstructure and carrying said horizontal axis of said belt carrier, said support arm extending to a feed end of said throw-off belt under said feed chute, a feed device mounted on said superstructure at opposite sides of said feed chutes, and feed device mounting means for moving said feed device on each side of said feed chute toward and away from said feed chute in a horizontal direction, each feed device comprising a feed trough for receiving material and a bearing connected to each feed trough for pivoting each feed trough about at least one axis which is on one side of said feed end of said throw-off belt and extends in the conveying direction of said throw-off belt.

2. A travelling hopper belt car according to claim 1, wherein said feed chute has a rear section and a front section, said front section being closer to said horizontal axis of said belt carrier than said rear section, said upper side section of each side wall extending only over said rear section of said feed chute.

3. A travelling hopper belt car according to claim 1, wherein said feed chute includes a back wall extending between said side walls, said back wall having a lower back section fixed to said belt carrier and an upper back section pivotally mounted to said lower back section about a horizontal axis for folding down into an approximately horizontal position.

4. A travelling hopper belt car according to claim 3, wherein said feed chute has a rear section and a front section, said front section being closer to said horizontal axis of said belt carrier than said rear section, said upper side section of each side wall extending only over said rear section of said feed chute.

5. A travelling hopper belt car according to claim 4, including a hydraulic cylinder connected between said belt carries, and said upper section of each of said side and back walls for folding said upper section up and down on said lower sections.

6. A travelling hopper belt car according to claim 1, including a cantilever arm mounted to each feed device, each feed trough being pivotally mounted to one of said cantilever arms for pivoting over said feed chute.

7. A travelling hopper belt car according to claim 6, including a hydraulic cylinder connected between each feed device and its feed trough for pivoting the feed troughs, each feed trough having a leading edge in the direction of its pivoting toward said feed chute which lies in the vicinity of an upper edge of one side wall of said feed chute with said feed trough in its highest point of pivoting over said feed chute.

8. A travelling hopper belt car according to claim 7, including a grizzly screen pivotally mounted on each feed trough about a pivot axis on a side of each feed trough spaced away from said throw-off belt for pivoting said grizzly screens away from said feed chute.

9. A travelling hopper belt car according to claim 1, wherein each feed trough declines in height from said feed end of said throw-off belt in a direction of movement of said throw-off belt.

10. A travelling hopper belt car according to claim 9, wherein each feed trough widens in a horizontal plane from said feed end of said throw-off belt in a conveying direction of said throw-off belt.

11. A travelling hopper belt car according to claim 1, wherein said mounting means comprises rollers connected to said feed devices and rollably engaged on said support arm adjacent said feed end of said throw-off belt on opposite sides of said throwoff belt.

12. A travelling hopper belt car comprising a belt carrier pivotally mounted about a horizontal axis for pivoting in a vertical plane, a throw-off conveyor belt movably mounted on said belt carrier for movement in a conveying direction; a feed chute connected to said belt carrier adjacent said horizontal axis, said feed chute having side walls which each include a lower section fixed to said belt carrier and an upper side section pivotally mounted to each lower section respectively about a further horizontal axis for folding down at least to a vertical height of said further horizontal axis, a travelling superstructure, said belt carrier being pivotally mounted about said horizontal axis to said travelling superstructure, said travelling superstructure being mounted for pivoting in a horizontal plane about a vertical axis, a support arm mounted on said superstructure and carrying said horizontal axis of said belt carrier, said support arm extending to a feed end of said throw-off belt under said feed chute, height adjustable supporting feed connected to said support arm at said feed end for raising and lowering said support arm at said feet and, a feed device mounted on said superstructure at opposite sides of said feed chute and at said feed end of said throw-off belt, and feed device mounting means for moving said feed device on each side of said feed chute toward and away from said feed chute, each feed device comprising a feed trough for receiving material and a bearing connected to each feed trough for pivoting each feed trough about at least one axis which is on one side of said throw-off belt and extends in a direction of movement of said throw-off belt, a cantilever arm mounted to each feed device, each feed trough being pivotally mounted to one of said cantilever arms for pivoting over said feed chute, a hydraulic cylinder connected between each feed device and its feed trough for pivoting the feed troughs, each feed trough having a leading edge in the direction of its pivoting toward said feed chute which lies in the vicinity of an upper edge of one side wall of said feed chute with said feed trough in its highest point of pivoting over said feed chute, and a grizzly screen pivotally mounted on each feed trough about a pivot axis on a side of each feed trough spaced away from said throw-off belt for pivoting said grizzly sreens away from said feed chute.

13. A travelling hopper belt car according to claim 12, wherein each grizzly screen has a vertical section positioned adjacent said feed chute and a horizontal section engaged over each feed trough respectively.

* * * * *